US012779988B2

(12) United States Patent
Okuda et al.

(10) Patent No.: US 12,779,988 B2
(45) Date of Patent: Nov. 3, 2026

(54) DRIVE DEVICE FOR ELECTRIC VEHICLE

(71) Applicant: TOYOTA JIDOSHA KABUSHIKI KAISHA, Aichi-ken (JP)

(72) Inventors: Koichi Okuda, Toyota (JP); Yusuke Suzuki, Nisshin (JP); Shinji Tsuchiya, Nisshin (JP); Tadashi Suzuki, Nishio (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 258 days.

(21) Appl. No.: 18/666,818

(22) Filed: May 17, 2024

(65) Prior Publication Data

US 2024/0391314 A1 Nov. 28, 2024

(30) Foreign Application Priority Data

May 23, 2023 (JP) ................................ 2023-084974

(51) Int. Cl.
*B60K 17/04* (2006.01)
*B60K 1/02* (2006.01)
*F16H 57/04* (2010.01)
*F16H 63/34* (2006.01)

(52) U.S. Cl.
CPC .............. *B60K 17/043* (2013.01); *B60K 1/02* (2013.01); *F16H 57/0441* (2013.01); *F16H 63/3416* (2013.01)

(58) Field of Classification Search
CPC ......... F16H 2200/0021; F16H 63/3416; F16H 63/34; F16H 57/0006; F16H 57/028; B60K 17/043; B60K 17/04; B60K 1/02; F16F 15/22; F16F 2228/04; F16F 2228/06
See application file for complete search history.

(56) References Cited

U.S. PATENT DOCUMENTS

| | | | | |
|---|---|---|---|---|
| 12,508,898 | B2 * | 12/2025 | Yanagihara | B60K 17/12 |
| 2012/0015772 | A1 * | 1/2012 | Kira | B60K 6/442 903/910 |
| 2014/0335998 | A1 * | 11/2014 | Ichikawa | B60K 6/445 477/5 |
| 2020/0039343 | A1 * | 2/2020 | Taikou | B60K 17/08 |
| 2022/0299111 | A1 * | 9/2022 | Steiner | F16H 63/3466 |

FOREIGN PATENT DOCUMENTS

| | | | | |
|---|---|---|---|---|
| JP | 2006067753 | A | * | 3/2006 |
| JP | 2009210028 | A | * | 9/2009 |
| JP | 2018-002065 | A | | 1/2018 |

* cited by examiner

*Primary Examiner* — Lori Wu
(74) *Attorney, Agent, or Firm* — HAUPTMAN HAM, LLP

(57) ABSTRACT

A drive device for an electric vehicle having a first drive wheel and a second drive wheel. The drive device includes: (a) a first speed reducer through which the first drive wheel is to be driven by a first electric motor, and (b) a second speed reducer through which the second drive wheel is to be driven by a second electric motor. The first speed reduce and the second speed reducer are constituted by respective speed reduction mechanisms that are the same in kind as each other. The first speed reducer and the second speed reducer have respective natural frequencies that are different from each other.

1 Claim, 1 Drawing Sheet

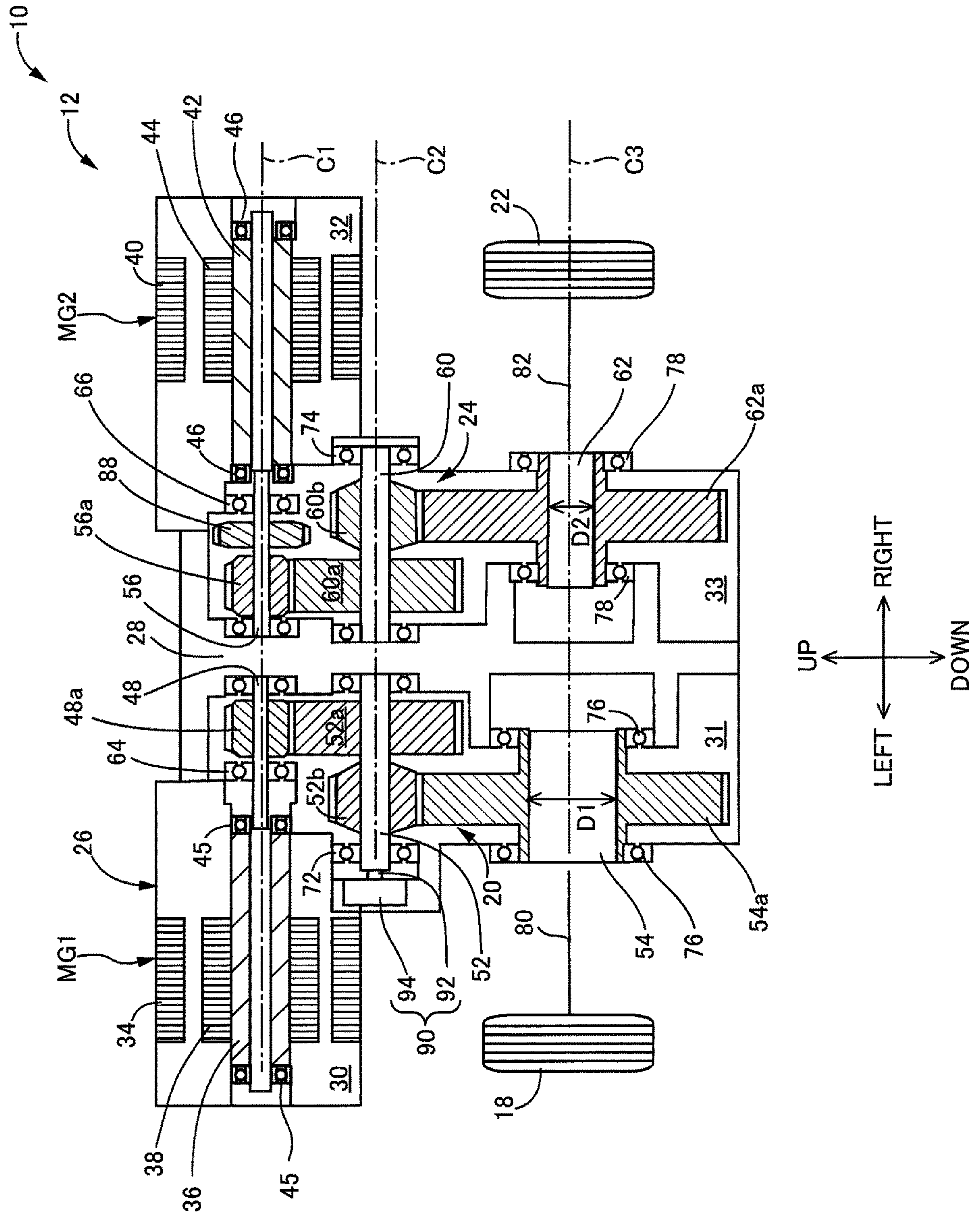
10
12
C1
C2
C3
MG1
MG2
UP
DOWN
LEFT
RIGHT
D1
D2
18
20
22
24
26
28
30
31
32
33
34
36
38
40
42
44
45
46
48
48a
52
52a
52b
54
54a
56
56a
60
60a
60b
62
62a
64
66
72
74
76
78
80
82
88
90
92
94

DRIVE DEVICE FOR ELECTRIC VEHICLE

This application claims priority from Japanese Patent Application No. 2023-084974 filed on May 23, 2023, the disclosure of which is herein incorporated by reference in its entirety.

FIELD OF THE INVENTION

The present invention relates to a drive device for an electric vehicle having a first drive wheel and a second drive wheel, wherein the drive device includes (a) a first speed reducer through which the first drive wheel is to be driven and rotated by a first electric motor and (b) a second speed reducer through which the second drive wheel is to be driven and rotated by a second electric motor. More particularly, the present invention relates to a technique for suppressing generation of vibration and noise from the drive device while avoiding increase of size of the drive device.

BACKGROUND OF THE INVENTION

There is known a drive device for an electric vehicle having a first drive wheel and a second drive wheel, wherein the drive device includes (a) a first speed reducer through which the first drive wheel is to be driven and rotated by a first electric motor and (b) a second speed reducer through which the second drive wheel is to be driven and rotated by a second electric motor. For example, a drive device for an electric vehicle described in Patent Document 1 is such a device.

PRIOR ART DOCUMENT

Patent Document

[Patent Document 1]

Japanese Patent Application Laid-Open No. 2018-002065

When the first and second electric motors are rotated at the same speed with the first and second speed reducers being constituted by respective speed reduction mechanisms that are based on the same principle, vibration generated by the first electric motor and vibration generated by the second electric motor, which are known as motor noise, are transmitted through the first and second speed reducers to excite each other, whereby the vibration is increased by resonance. In contrast, according to the drive device described in the Patent Document 1, the first speed reducer and the second speed reducer are constituted by speed reduction mechanisms that are different in kind from each other, for example, such that the first speed reducer is constituted by one of a gear-type reduction mechanism, a belt-type reduction mechanism and a chain-type reduction mechanism, while the second speed reducer is constituted by another one of them. Therefore, vibration characteristics of the first electric motor and the first speed reducer are different from those of the second electric motor and the second speed reducer, so that the vibration generated by the first electric motor and the vibration generated by the second electric motor do not excite each other, and accordingly the increase in the vibration of the drive device is suppressed.

SUMMARY OF THE INVENTION

By the way, in the drive device described in Patent Document 1, the first speed reducer and the second speed reducer are constituted by speed reduction mechanisms using different speed reduction principles. Therefore, for example, where the first speed reducer is constituted by a gear-type reduction mechanism, the second speed reducer is constituted by a belt-type reduction mechanism or a chain-type reduction mechanism. In this way, where the first speed reducer and the second speed reducer are constituted by speed reduction mechanisms using different reduction principles, there is a disadvantage that the number of kinds of components is increased whereby the structure of the drive device is complicated.

The present invention has been made in view of the above circumstances. An object of the present invention is to provide a drive device for an electric vehicle, which is capable of suppressing resonance of motor noise generated from a pair of electric motors without complicating the structure.

The present invention provides a drive system for an electric vehicle having a first drive wheel and a second drive wheel. The drive device includes (a) a first speed reducer through which the first drive wheel is to be driven by a first electric motor, and (b) a second speed reducer through which the second drive wheel is to be driven by a second electric motor. The first speed reduce and the second speed reducer are constituted by respective speed reduction mechanisms that are the same in kind as each other. The first speed reducer and the second speed reducer have respective natural frequencies that are different from each other.

According to the drive device of the present invention, the first speed reducer and the second speed reducer have the natural frequencies different from each other. Accordingly, since noise characteristics of the first speed reducer and the second speed reducer are different from each other, a peak of the synthesized noise level is lowered. Therefore, the vibration level of the drive device is suppressed without complicating the structure of the drive device.

Preferably, each of the first speed reducer and the second speed reducer is constituted by a plurality of power transmission components, wherein the first speed reducer and the second speed reducer are the same as each other in terms of a number of the power transmission components, and wherein at least one of the power transmission components of the first speed reducer has a mass different from a mass of at least one of the power transmission components of the second speed reducer that corresponds to the at least one of the power transmission components of the first speed reducer. Accordingly, the above-described at least one of the plurality of power transmission components of the first speed reducer and the above-described at least one of the plurality of power transmission components of the second speed reducer have different rotational inertias. Therefore, the first speed reducer and the second speed reducer have different natural frequencies due to the difference in dynamic rigidity, and the peak of the synthesized noise level is lowered, and the vibration level of the drive device is suppressed.

Preferably, one of the above-described at least one of the power transmission components of the first speed reducer and the above-described at least one of the power transmission components of the second speed reducer is provided with a parking lock gear that constitutes a part of a parking lock mechanism. The mass of the power transmission component provided with the parking lock gear is substantially larger than the mass of the power transmission component not provided with the parking lock gear. Therefore, the first speed reducer and the second speed reducer have different inertial masses from each other so as to provide a difference in dynamic rigidity, and the peak of the synthesized noise level is lowered to suppress the vibration level of the drive device.

Preferably, one of the above-described at least one of the power transmission components of the first speed reducer and the above-described at least one of the power transmission components of the second speed reducer is connected to an oil pump. The mass of the power transmission component connected to the oil pump is substantially larger than the mass of the power transmission component not connected to the oil pump. Therefore, the first speed reducer and the second speed reducer have different inertial masses from each other so as to provide a difference in dynamic rigidity, and the peak of the synthesized noise level is lowered to suppress the vibration level of the drive device.

Preferably, each of the first speed reducer and the second speed reducer is constituted by a plurality of power transmission components, wherein the first speed reducer and the second speed reducer are the same as each other in terms of a number of the power transmission components, and wherein at least one of the power transmission components of the first speed reducer has a rigidity different from a rigidity of at least one of the power transmission components of the second speed reducer that corresponds to the at least one of the power transmission components of the first speed reducer. The different rigidities are realized by, for example, different outside diameters, different hole shapes and/or different materials. Thus, the first speed reducer and the second speed reducer have dynamic rigidities different from each other, and the peak of the combined noise level is lowered, and the vibration level of the drive device is suppressed.

Preferably, the first speed reducer and the second speed reducer are constituted by gear-type reduction mechanisms, and are constructed to have the same reduction ratio, and the first electric motor and the first speed reducer and the second electric motor and the second speed reducer are disposed symmetrically with respect to a center line of the drive device. Thus, a center of gravity of the drive device is kept in a center in a width direction of the electric vehicle.

Preferably, a first rotor shaft of the first electric motor and a second rotor shaft of the second electric motor are arranged to extend in a direction perpendicular to the center line and to be coaxial with each other. The first speed reducer includes: a first input shaft coaxially connected to the first rotor shaft; a first counter shaft having outer peripheral teeth meshing with outer peripheral teeth of the first input shaft and disposed parallel to the first input shaft; a first intermediate shaft having large-diameter teeth meshing with the outer peripheral teeth of the first counter shaft and small-diameter teeth smaller in diameter than the large-diameter teeth and disposed parallel to the first counter shaft; and a first output shaft having a first ring gear meshing with the small-diameter teeth of the first intermediate shaft and disposed parallel to the first intermediate shaft. The second speed reducer includes: a second input shaft coaxially connected to the second rotor shaft; a second counter shaft having outer peripheral teeth meshing with outer peripheral teeth of the second input shaft and disposed parallel to the second input shaft and coaxially with the first counter shaft; a second intermediate shaft having large-diameter teeth meshing with the outer peripheral teeth of the second counter shaft and small-diameter teeth smaller in diameter than the large-diameter teeth and disposed parallel to the second counter shaft and coaxially with the first intermediate shaft; and a second output shaft having a second ring gear meshing with the small-diameter teeth of the second intermediate shaft and disposed parallel to the second intermediate shaft and coaxially with the first output shaft. Thus, the first speed reducer and the second speed reducer are constituted by respective speed reduction mechanisms that are the same in kind as each other, i.e., by the respective gear-type reduction mechanisms, so that components common to the first and second speed reducers can be used, so as to prevent the structure of the driving device from being complicated.

BRIEF DESCRIPTION OF THE DRAWING

FIG. 1 is a view for explaining a drive device for an electric vehicle according to an embodiment of the present invention.

DETAILED DESCRIPTION OF PREFERRED EMBODIMENT

Hereinafter, an embodiment of the present invention will be described in detail with reference to the drawing.

Embodiment

FIG. 1 is a development view showing a drive device 12 for an electric vehicle 10 according to the embodiment of the present invention, wherein the view is a section containing rotation axes C1, C2 and C3 of power transmission components described later. In FIG. 1, the drive device 12 includes first and second electric motors MG1 and MG2 as independent drive sources for driving the electric vehicle 10, a first speed reducer 20 for reducing rotation of the first electric motor MG1 and outputting the rotation to a first drive wheel 18 as one of drive wheels that is located in a left-side portion in FIG. 1, a second speed reducer 24 for reducing rotation of the second electric motor MG2 and outputting the rotation to a second drive wheel 22 as the other of the drive wheels that is located on a right-side portion in FIG. 1, and a casing 26 that houses the first and second electric motors MG1 and MG2 and the first and second speed reducers 20 and 24.

The casing 26 preferably includes a central partition wall 28 extending along a center in a left and right direction that corresponds to a widthwise center of the vehicle 10, i.e., a center of the vehicle 10 in a width direction of the vehicle 10. The casing 26 is divided by the central partition wall 28 into first and second sections, wherein the first section includes a first motor room 30 accommodating the first electric motor MG1 and a first reducer room 31 accommodating the first speed reducer 20, and wherein the second section includes a second motor room 32 accommodating the second electric motor MG2 and a second reducer room 33 accommodating the second speed reducer 24. The first electric motor MG1 and the second electric motor MG2 are disposed in respective positions that are symmetric with respect to the center. The first speed reducer 20 and the second speed reducer 24 are disposed in respective positions that are symmetric with respect to the center. A plurality of power transmission components constituting the first speed reducer 20 and a plurality of power transmission components constituting the second speed reducer 24 are constructed symmetrically with respect to the center. Each one of the power transmission components of the first speed reducer 20 and a corresponding one of the power transmission components of the second speed reducer 24 are disposed in respective positions that are symmetric with respect to the center.

The first electric motor MG1 includes a first stator 34 which is fixed in a position and which has a tubular shape, and a first rotor 38 which is located on an inner peripheral side of the first stator 34 and which is rotatably supported by a first rotor shaft 36. The second electric motor MG2 includes a second stator 40 which is fixed in a position and which has a tubular shape, and a second rotor 44 which is located on an inner peripheral side of the second stator 40 and which is rotatably supported by a second rotor shaft 42. The first rotor shaft 36 and the second rotor shaft 42 are coaxial with each other, and extend in a direction perpendicular to the center in FIG. 1. That is, the first rotor shaft 36 and the second rotor shaft 42 are rotatably supported by the casing 26 through a pair of bearings 45 and a pair of bearings 46, respectively, around the rotation axis C1 perpendicular to the center line C1 in FIG. 1.

The first speed reducer 20 is constituted by four power transmission components as the above-described plurality of power transmission components involved in power transmission. The plurality of power transmission components of the first speed reducer 20 include a first input shaft 48, a first intermediate shaft 52 and a first output shaft 54, which are parallel to one another. Similarly, the second speed reducer 24 is constituted by four power transmission components as the above-described plurality of power transmission components involved in power transmission, which are the same as those of the first speed reducer 20, and has the same reduction ratio as that of the first speed reducer 20. The plurality power transmission components include a second input shaft 56, a second intermediate shaft 60 and a second output shaft 62, which are parallel to one another. The first input shaft 48 and the second input shaft 56 are substantially the same in construction, the first intermediate shaft 52 and the second intermediate shaft 60 are substantially the same in construction, and the first output shaft 54 and the second output shaft 62 are substantially the same in construction, except for some differences described below.

The first input shaft 48 is supported by a pair of bearings 64 so as to be rotatable about the rotation axis C1 perpendicular to the center while being connected to the first rotor shaft 36 by spline fitting. The first input shaft 48 includes outer peripheral teeth 48*a*. The second input shaft 56 is supported by a pair of bearings 66 so as to be rotatable about the rotation axis C1 while being connected to the second rotor shaft 42 by spline fitting. The second input shaft 56 includes outer peripheral teeth 56*a*. The first input shaft 48 and the second input shaft 56 are coaxial with each other.

The first intermediate shaft 52 includes large-diameter teeth 52*a* meshing with the outer peripheral teeth 48*a* of the first input shaft 48 and small-diameter teeth 52*b* having a smaller diameter than the large-diameter teeth 52*a*. The first intermediate shaft 52 is supported by a pair of bearings 72 so as to be rotatable about the rotation axis C2 parallel to the rotation axis C1. The second intermediate shaft 60 includes large-diameter teeth 60*a* meshing with the outer peripheral teeth 58*a* of the second input shaft 58 and small-diameter teeth 60*b* having a smaller diameter than the large-diameter teeth 60*a*. The second intermediate shaft 60 is supported by a pair of bearings 74 so as to be rotatable about the rotation axis C2 parallel to the rotation axis C1. The second intermediate shaft 60 is coaxial with the first intermediate shaft 52.

The first output shaft 54 has outer peripheral teeth 54*a* that mesh with the small-diameter teeth 52*b* of the first intermediate shaft 52. The first output shaft 54 is supported by a pair of bearings 76 so as to be rotatable about the rotation axis C3 parallel to the rotation axis C1. The second output-shaft 62 has outer peripheral teeth 62*a* that mesh with the small-diameter teeth 60*b* of the second intermediate shaft 60. The second output shaft 62 is supported by a pair of bearings 78 so as to be rotatable about the rotation axis C3 parallel to the rotation axis C1. The second output shaft 62 is coaxial with the first output shaft 54.

The first and second drive wheels 18 and 22 as left and right wheels of the vehicle 10 are connected to the first output shaft 54 and the second output shaft 62 through a first drive shaft 80 and a second drive shaft 82, respectively. The rotation of the first electric motor MG1 is decelerated by the first speed reducer 20 and transmitted to the first drive wheel 18. Independently of the rotation of the first electric motor MG1, the rotation of the second electric motor MG2 is decelerated by the second speed reducer 24 and transmitted to the second drive wheel 22.

At least one of the power transmission components of the first speed reducer 20 and at least one of the power transmission components of the second speed reducer 24, which corresponds to the at least one of the power transmission components of the first speed reducer 20, have different masses or rigidities. Namely, at least one of the first input shaft 48, the first intermediate shaft 52 and the first output shaft 54 of the first speed reducer 20 and at least one of the second input shaft 56, the second intermediate shaft 60 and the second output shaft 62 of the second speed reducer 24, which corresponds to the at least one of the first input shaft 48, the first intermediate shaft 52 and the first output shaft 54 of the first speed reducer 20, have different masses or rigidities. Thus, the first speed reducer 20 and the second speed reducer 24 have natural frequencies different from each other. In the present embodiment, as described below, the first input shaft 48 and the second input shaft 56 have different masses or rigidities, the first intermediate shaft 52 and the second intermediate shaft 60 have different masses or rigidities, and the first output shaft 54 and the second output shaft 62 have different masses or rigidities.

The first input shaft 48 and the second input shaft 56 are the same as each other in basic shape. An outside diameter of the outer peripheral teeth 48*a* of the first input shaft 48 and an outside diameter of the outer peripheral teeth 56*a* of the second input shaft 56 are the same as each other. However, a portion of the second input shaft 56 from the outer peripheral teeth 56*a* to the second electric motor MG2 is longer than a portion of the first input shaft 48 from the outer peripheral teeth 48*a* to the first electric motor MG1. Further, a parking lock gear 88 is fitted on the above-described portion of the second input shaft 56 between the outer peripheral teeth 56*a* to the second electric motor MG2. The parking lock gear 88 is a part of a parking lock mechanism (not shown), and meshes with a parking lock pawl (not shown) when the vehicle 10 is stopped. When the first input shaft 48 is compared with the second input shaft 56 on which the parking lock gear 88 is fitted, the second input shaft 56 has a relatively large mass in rotation and a relatively large rotational inertia as compared with the first input shaft 48.

The first intermediate shaft 52 and the second intermediate shaft 60 have the same shape, and accordingly are constituted by respective components that are the same as each other. However, a rotor shaft 92 of an oil pump 90 is connected to an end of the first intermediate shaft 52 on side of the first electric motor MG1. The oil pump 90 is configured to supply a lubrication oil to each part of the drive device 12, and includes a pump rotor (not shown) that is to be driven and rotated by the rotor shaft 92 in a pump housing 94. When the first intermediate shaft 52 to which the rotor shaft 92 is connected is compared with the second intermediate shaft 60, the first intermediate shaft 52 has a relatively large mass in rotation and a relatively large rotational inertia and also has a relatively large rotational resistance, as compared with the second intermediate shaft 60.

As described above, the first input shaft 48 and the second input shaft 56 are the same as each other in basic shape, and the outside diameter of the outer peripheral teeth 48*a* of the first input shaft 48 and the outside diameter of the outer peripheral teeth 56*a* of the second input shaft 56 are the same as each other. However, an outside diameter D1 of the first output shaft 54 is made larger than an outside diameter D2 of the second output shaft 62. The first output shaft 54 having a relatively large diameter has a relatively large mass in rotation and a relatively large rotational inertia, as compared with the second output shaft 62.

According to the drive device 12 of the present embodiment, the first speed reducer 20 and the second speed reducer 24 housed in the casing 26 of the drive device 12 have natural frequencies different from each other so as to suppress vibration (motor noise) generated by the first electric motor MG1 and vibration (motor noise) generated by the second electric motor MG2 from being transmitted through the first speed reducer 20 and the second speed reducer 24 and being excited to each other. Thus, the noise characteristics of the first speed reducer 20 and the second speed reducer 24 are different from each other, and thus the peak of the synthesized noise level is lowered. Therefore, the vibration level of the driving device 12 is suppressed without complicating the structure of the driving device 12.

In the drive device 12 of the present embodiment, the first speed reducer 20 and the second speed reducer 24 are constituted by the same number of power transmission components, and at least one of the power transmission components of the first speed reducer 20, for example, the first output shaft 54, and at least one of the power transmission components of the second speed reducer 24, for example, the second output shaft 62, have different masses. Accordingly, the first output shaft 54 of the first speed reducer 20 and the second output shaft 62 of the second speed reducer 24 have different rotational inertias. Therefore, the first and second speed reducers 20 and 24 have different natural frequencies due to the difference in dynamic rigidity. Therefore, the peak of the synthesized noise level is lowered, and the vibration level of the driving device 12 is suppressed.

In the drive device 12 of the embodiment, the parking lock gear 88, which constitutes a part of the parking lock mechanism, is provided on one of the first input shaft 48 (as at least one of the power transmission components of the first speed reducer 20) and the second input shaft 56 (as at least one of the power transmission components of the second speed reducer 24 that corresponds to the at least one of the power transmission components of the first speed reducer 20). Thus, in a case in which the parking lock gear 88 is provided on the second input shaft 56, the mass of the second input shaft 56 is substantially larger than the mass of the first input shaft 48. Therefore, the power transmission components of the first speed reducer 20 and the power transmission components of the second speed reducer 24 have mutually different inertial masses to provide a difference in dynamic rigidity, and the peak of the synthesized noise level is lowered to suppress the vibration level of the driving device 12.

In the drive device 12 of the present embodiment, the oil pump 90 is connected to one of the first intermediate shaft 52 (as at least one of the power transmission components of the first speed reducer 20) and the second intermediate shaft 60 (as at least one of the power transmission components of the second speed reducer 24 that corresponds to the at least one of the power transmission components of the first speed reducer 20). Thus, in a case in which the oil pump 90 is connected to the first intermediate shaft 52, the mass of the first intermediate shaft 52 is substantially larger than the mass of the second intermediate shaft 60. Therefore, the power transmission components of the first speed reducer 20 and the power transmission components of the second speed reducer 24 have mutually different inertial masses to provide a difference in dynamic rigidity, and the peak of the synthesized noise level is lowered to suppress the vibration level of the driving device 12.

In the drive device 12 of the present embodiment, each of the first speed reducer 20 and the second speed reducer 24 is constituted by the plurality of power transmission components, and the first speed reducer 20 and the second speed reducer 24 are the same as each other in terms of the number of the power transmission components. The first output-shaft 54, which is one of the plurality of power transmission components of the first speed reducer 20, and the second output-shaft 62, which is a corresponding one of the plurality of power transmission components of the second speed reducer 24, have different rigidities due to the difference between the diameter D1 of the first output-shaft 54 and the diameter D2 of the second output-shaft 62 (D1>D2). Thus, the power transmission components of the first speed reducer 20 and the power transmission components of the second speed reducer 24 have dynamic rigidity different from each other, and the peak of the synthesized noise level is lowered, and the vibration level of the driving device 12 is suppressed.

According to the driving device 12 of the present embodiment, the first speed reducer 20 and the second speed reducer 24 are constituted by the same type of speed reduction mechanism, that is, a gear-type speed reduction mechanism, so that common parts can be used for the first speed reducer 20 and the second speed reducer 24, and therefore, the structure of the driving device 12 is not complicated.

Although the embodiment of the present invention has been described with reference to the drawing, the present invention may be implemented in other modes.

For example, the first speed reducer 20 and the second speed reducer 24 are constructed such that their natural frequencies are different from each other. The natural frequencies different from each other means that a difference in natural frequencies is formed in which vibration (motor noise) generated by the first electric motor MG1 and vibration (motor noise) by the second electric motor MG2 are suppressed from being excited by being transmitted through the first speed reducer 20 and the second speed reducer 24. For example, the natural frequencies of the first speed reducer 20 and the second speed reducer 24 are made different from each other such that a peak of synthesized noise level is lower than a peak of resonance point of each of the first speed reducer 20 and the second speed reducer 24 and such that the natural frequency is larger than a half width of vibration intensity of the resonance point of each of the first speed reducer 20 and the second speed reducer 24.

In the embodiment shown in FIG. 1, the differences between the first speed reducer 20 and the second speed reducer 24 are that (i) the parking lock gear 88 is fitted on the portion of the second input shaft 56, that (ii) the rotor shaft 92 of the oil pump 90 is connected to the end of the first intermediate shaft 52, and that (iii) the diameter D1 of the first input shaft 54 is larger than the diameter D2 of the second input shaft 62. However, all of these three differences do not necessarily have to be provided as long as at least one of the three differences is provided. Further, the parking lock gear 88 may be fitted on either one of the first output shaft 54 and the second output shaft 62, the rotor shaft 92 of the oil pump 90 may be connected to either one of the first output shaft 54 and the second output shaft 62, and/or the diameter of either one of the first output shaft 54 and the second output shaft 62 may be larger than that of the other.

The parking lock gear 88 may be fitted on the first input shaft 48 that is symmetrical to the second input shaft 56, the rotor shaft 92 may be connected to the end of the second intermediate shaft 60 that is symmetrical to the first intermediate shaft 52, and/or the diameter D1 of the first input shaft 54 may be smaller than the diameter D2 of the second input shaft 62.

In the above-described embodiment, the diameter D1 of the first shaft 54 is larger than the diameter D2 of the second shaft 62 in order to make the masses or rigidities of the first and second shafts 54 and 62 different from each other. However, the first and second shafts 54 and 62 may be made of respective materials different from each other, and/or one of the first and second shafts 54 and 62 may be constituted by a hollow shaft while the other may be constituted by a solid shaft. In short, at least one of the power transmission components of the first speed reducer 20 and corresponding at least one of the power transmission components of the second speed reducer 24 may have different masses or rigidities.

In the above-described embodiment, the first and second electric motors MG1 and MG2 are disposed in respective positions that are symmetric with respect to the center, the first and second speed reducers 20 and 24 are disposed in respective positions that are symmetric with respect to the center, and the power transmission components constituting the first speed reducer 20 and the power transmission components constituting the second speed reducer 24 are constructed symmetrically with respect to the center and are disposed in respective positions that are symmetric with respect to the center. However, the line-symmetrical arrangement and construction with respect to the center are not essential.

In the above-described embodiment, the first rotor shaft 36 of the first electric motor MG1 and the second rotor shaft 42 of the second electric motor MG2 are disposed to extend perpendicularly to the center. However, the first rotor shaft 36 of the first electric motor MG1 and the second rotor shaft 42 of the second electric motor MG2 may be disposed to extend in parallel with the center.

The above description is merely an example of the present invention, and various modifications can be made without departing from the scope of the present invention.

NOMENCLATURE OF ELEMENTS

10: electric vehicle
12: drive device
18: first drive wheel
20: first speed reducer
22: second drive wheel
24: second speed reducer
26: casing
28: central partition wall
30: first motor room
31: first reducer room
32: second motor room
33: second reducer room
34: first stator
36: first rotor shaft
38: first rotor
40: second stator
42: second rotor shaft
44: second rotor
45: bearing
46: bearing
48: first input shaft
48*a*: outer peripheral teeth
52: first intermediate shaft
52*a*: large-diameter teeth
52*b*: small-diameter teeth
54: first output shaft
54*a*: outer peripheral teeth
56: second input shaft
56*a*: outer peripheral teeth
60: second intermediate shaft
60*a*: large-diameter teeth
60*b*: small-diameter teeth
62: second output shaft
62*a*: outer peripheral teeth
64: bearing
66: bearing
72: bearing
74: bearing
76: bearing
78: bearing
80: first drive shaft
82: second drive shaft
88: parking lock gear
90: oil pump
92: rotor shaft
MG1: first electric motor
MG2: second electric motor

What is claimed is:

1. A drive device for an electric vehicle having a first drive wheel and a second drive wheel, the drive device comprising:

a first speed reducer through which the first drive wheel is to be driven by a first electric motor, and a second speed reducer through which the second drive wheel is to be driven by a second electric motor, wherein the first speed reducer and the second speed reducer are constituted by respective speed reduction mechanisms that are the same in kind as each other, wherein the first speed reducer and the second speed reducer have respective natural frequencies that are different from each other, wherein each of the speed reduction mechanism of the first speed reducer and the speed reduction mechanism of the second speed reducer is constituted by a plurality of power transmission components, wherein the first speed reducer and the second speed reducer are the same as each other in terms of a number of the power transmission components, wherein at least one of the power transmission components of the first speed reducer has a mass different from a mass of at least one of the power transmission components of the second speed reducer that corresponds to the at least one of the power transmission components of the first speed reducer, and wherein one of the at least one of the power transmission components of the first speed reducer and the at least one of the power transmission components of the second speed reducer is connected to an oil pump.

* * * * *